(12) United States Patent  
Yan et al.

(10) Patent No.: US 10,454,638 B2  
(45) Date of Patent: Oct. 22, 2019

(54) BIT ALLOCATION METHOD, APPARATUS FOR MULTICARRIER MODULATION SIGNAL, AND SYSTEM

(71) Applicant: FUJITSU LIMITED, Kawasaki-shi, Kanagawa (JP)

(72) Inventors: Weizhen Yan, Beijing (CN); Bo Liu, Beijing (CN); Lei Li, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 16 days.

(21) Appl. No.: 14/927,636

(22) Filed: Oct. 30, 2015

(65) Prior Publication Data

US 2016/0127091 A1 May 5, 2016

(30) Foreign Application Priority Data

Oct. 31, 2014 (CN) .......................... 2014 1 0602265

(51) Int. Cl.
*H04L 5/00* (2006.01)
*H04L 27/26* (2006.01)

(52) U.S. Cl.
CPC ............ *H04L 5/0046* (2013.01); *H04L 5/006* (2013.01); *H04L 27/2614* (2013.01);
(Continued)

(58) Field of Classification Search
None
See application file for complete search history.

(56) References Cited

U.S. PATENT DOCUMENTS 6,351,473 B1 * 2/2002 Reusens .................... H04L 1/04  
                                                                      370/480  
7,313,195 B2 * 12/2007 Chen ................... H04L 27/2614  
                                                                       375/286  
(Continued)

FOREIGN PATENT DOCUMENTS

| CN | 101340224 | 1/2009 |
|---|---|---|
| CN | 101600247 | 12/2009 |

(Continued)

OTHER PUBLICATIONS

P.S.Chow et. al., "A Practical Discrete Multitone Transceiver Loading Algorithm for Data Transmission over Spectrally Shaped Channels", Trans. Comm., vol. 43, No. 2, pp. 773 (1995).

(Continued)

*Primary Examiner* — Ayaz R Sheikh  
*Assistant Examiner* — Faiyazkhan Ghafoerkhan  
(74) *Attorney, Agent, or Firm* — Staas & Halsey LLP

(57) ABSTRACT

A bit allocation method, apparatus for a multicarrier modulation signal and a system where the method includes: lowering the number of bits of a subcarrier of minimum average power in subcarriers of the multicarrier modulation signal allocated with a maximum number of bits according to a predetermined total number of bits to be adjusted including setting a total number of bits to be adjusted; determining a target number of bits according to the total number of bits; allocating a bit number for each subcarrier of the multicarrier modulation signal by using a predetermined bit allocation method according to the target; and lowering the number of bits of a subcarrier of minimum average power in the subcarriers allocated with a maximum number of bits, until a lowered total number of bits is equal to the total number of bits to be adjusted.

9 Claims, 4 Drawing Sheets

(52) U.S. Cl.
CPC ...... H04L 27/2626 (2013.01); H04L 27/2647 (2013.01); H04L 5/0007 (2013.01)

(56) References Cited

U.S. PATENT DOCUMENTS

| | | | | |
|---|---|---|---|---|
| 8,570,988 | B2* | 10/2013 | Wallace | H04B 7/0421 370/328 |
| 8,750,151 | B2* | 6/2014 | Wallace | H04B 7/0421 370/208 |
| 9,077,597 | B2* | 7/2015 | Cepeda Lopez | H04L 27/3411 |
| 2001/0040869 | A1* | 11/2001 | Moss | H04L 27/2614 370/203 |
| 2003/0063556 | A1* | 4/2003 | Hernandez | H04L 27/2614 370/208 |
| 2003/0099302 | A1* | 5/2003 | Tong | H03M 13/258 375/264 |
| 2003/0202574 | A1* | 10/2003 | Budka | H04L 1/0003 375/227 |
| 2004/0213293 | A1* | 10/2004 | Basso | H04L 5/14 370/480 |
| 2005/0018702 | A1* | 1/2005 | Chen | H04L 27/2614 370/431 |
| 2005/0157812 | A1* | 7/2005 | Liu | H04L 27/2623 375/296 |
| 2006/0126748 | A1* | 6/2006 | Lin | H04L 27/2624 375/260 |
| 2009/0135934 | A1* | 5/2009 | Guerrieri | H04L 1/004 375/262 |
| 2010/0195755 | A1* | 8/2010 | Shapiro | H04L 27/2608 375/285 |
| 2011/0013683 | A1* | 1/2011 | Cepeda Lopez | H04L 27/2614 375/224 |
| 2014/0161169 | A1* | 6/2014 | Prinnerano | H04L 1/0005 375/229 |
| 2014/0334421 | A1* | 11/2014 | Sosa | H04L 5/0064 370/329 |
| 2015/0009929 | A1* | 1/2015 | Park | H04B 7/024 370/329 |
| 2015/0016570 | A1* | 1/2015 | Murakami | H04B 7/0667 375/308 |
| 2015/0333943 | A1* | 11/2015 | Prinnerano | H04L 1/0005 375/232 |
| 2016/0127091 | A1* | 5/2016 | Yan | H04L 5/0046 370/329 |

FOREIGN PATENT DOCUMENTS

| | | | | |
|---|---|---|---|---|
| CN | 101925068 | | 12/2010 | |
| CN | 102264124 | | 11/2011 | |
| CN | 102325115 | | 1/2012 | |
| EP | 1 104 140 | | 5/2001 | |
| EP | 1104140 | A2 * | 5/2001 | ......... H04L 27/2614 |
| EP | 1104140 | A2 * | 5/2001 | ......... H04L 27/2614 |
| JP | 2013-48373 | | 3/2013 | |

OTHER PUBLICATIONS

Japanese Office Action dated Jun. 4, 2019 in related Japanese Patent Application No. 2015-213443 (2 pages) (3 pages English Translation).

Chinese Search Report dated Mar. 20, 2018 in corresponding Chinese Patent Application No. 201410602265.9, 2 pages.

Chinese Office Action dated Mar. 20, 2018 in corresponding Chinese Patent Application No. 201410602265.9, 11 pages.

* cited by examiner

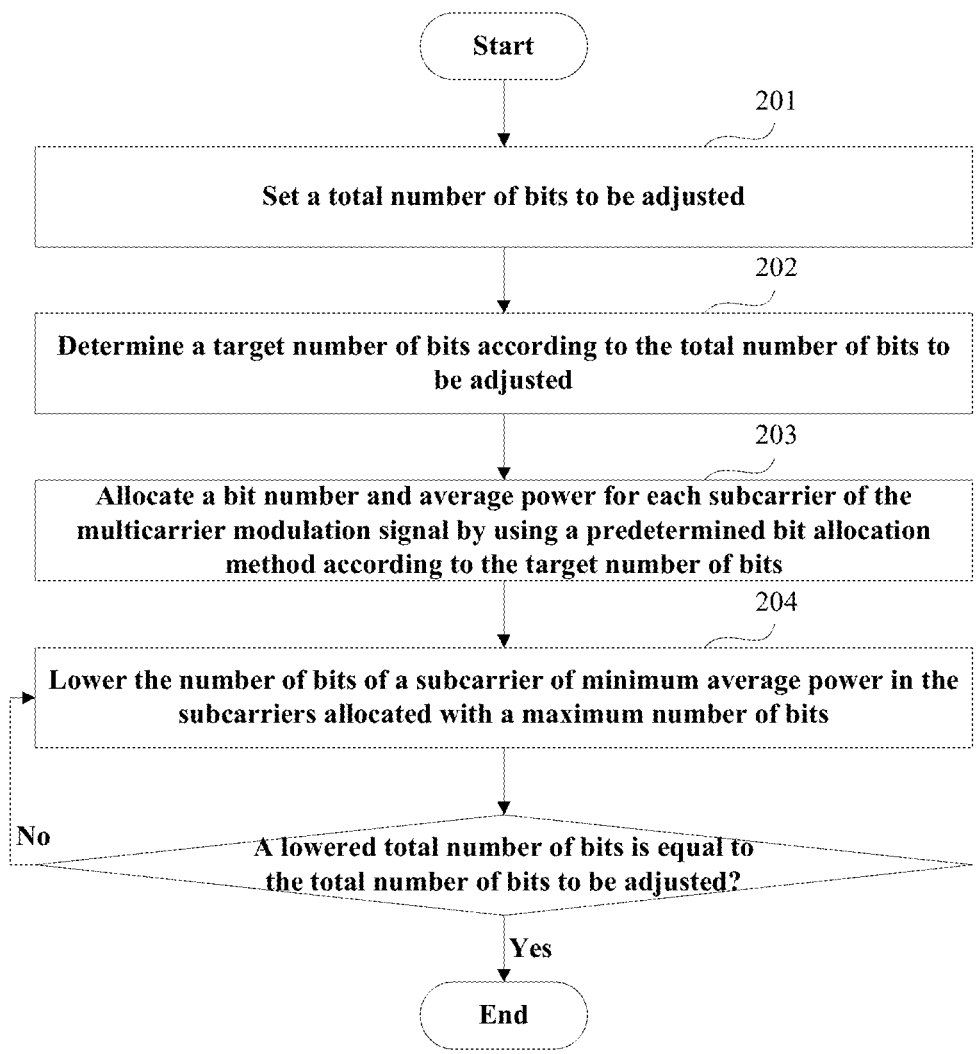

BIT ALLOCATION METHOD, APPARATUS FOR MULTICARRIER MODULATION SIGNAL, AND SYSTEM

CROSS REFERENCE TO RELATED APPLICATIONS

This application claims the benefit of Chinese Application No. 201410602265.9, filed Oct. 31, 2014, the disclosures of which is incorporated herein by reference.

BACKGROUND

1. Field

The present disclosure relates to the field of communication technologies, and in particular to a bit allocation method, apparatus for a multicarrier modulation signal, and system.

2. Description of the Related Art

Multicarrier modulation uses multiple subcarrier signals, in which a data stream is divided into some sub-data-streams, so that the sub-data-streams have much lower transmission rates, and such data are used respectively to modulate some subcarriers. A multicarrier modulation signal is featured in relatively low data transmission rate, and in relatively long symbol period, etc. The multicarrier modulation may be achieved in multiple technical ways, such as Discrete Multi-tone (DMT), and Orthogonal Frequency Division Multiplexing (OFDM), etc. Fast Fourier Transform (FFT) is an effective method for achieving multicarrier modulation.

A problem existing in a multicarrier modulation signal is that its Peak to Average Power Ratio (PAPR) is relatively high. In practical application, a peak value of signals outputted by a transmitter is usually limited. Hence, in order to increase average power of the signals, the PAPR of the signals needs to be lowered, wherein, a most often used method is to perform clipping on a multicarrier modulation signal. Signal distortion is introduced by the clipping method while the PAPR is lowered and the average power of the signal is increased. And on the other hand, as a multicarrier modulation signal is formed by superimposing multiple subcarrier signals, in some particular bit patterns, an extremely high PAPR will occur, and a clipping operation of of symbols of the extremely high PAPRs will produce extremely high signal distortion, thereby resulting in burst error in the symbols. Although the probability of occurrence of such a burst error is not high and has little effect on an average bit error rate, such a burst error will result in invalidation of Forward Error Correction (FEC) decoding, and hence result in communication failure.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

In order to overcome the defects proposed in the Background, embodiments of the present disclosure provide a bit allocation method, apparatus for a multicarrier modulation signal and system, so as to reduce burst errors of the multicarrier modulation signal.

According to a first aspect of the embodiments of the present disclosure, there is provided a bit allocation method for a multicarrier modulation signal, including: lowering the number of bits of a subcarrier of minimum average power in subcarriers of the multicarrier modulation signal allocated with a maximum number of bits according to a predetermined total number of bits to be adjusted.

According to a second aspect of the embodiments of the present disclosure, there is provided a bit allocation apparatus for a multicarrier modulation signal, including: an adjusting unit configured to lower the number of bits of a subcarrier of minimum average power in subcarriers of the multicarrier modulation signal allocated with a maximum number of bits according to a predetermined total number of bits to be adjusted.

According to a third aspect of the embodiments of the present disclosure, there is provided a transmitter in a multicarrier communication system, including the bit allocation apparatus as described above.

According to a fourth aspect of the embodiments of the present disclosure, there is provided a receiver in a multicarrier communication system, including the bit allocation apparatus as described above.

According to a fifth aspect of the embodiments of the present disclosure, there is provided a multicarrier communication system, including the bit allocation apparatus as described above.

According to another aspect of the embodiments of the present disclosure, there is provided a computer-readable program, wherein when the program is executed in a bit allocation apparatus for a multicarrier modulation signal, the program enables a computer to carry out the method as described in the first aspect in the apparatus.

According to a further aspect of the embodiments of the present disclosure, there is provided a storage medium in which a computer-readable program is stored, wherein the computer-readable program enables a computer to carry out the method as described in the first aspect in a bit allocation apparatus for a multicarrier modulation signal.

An advantage of the embodiments of the present disclosure exists in that by lowering the number of allocated bits of a subcarrier of lowest tolerance of clipping distortion, burst errors may be reduced, thereby ensuring success of FEC (forward error correction) decoding.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the principles and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/comprising/include/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the embodiments the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings:

FIG. 1 is a flowchart of a bit allocation method for a multicarrier modulation signal according to an implementation of the embodiment;

FIG. 2 is a flowchart of a bit allocation method for a multicarrier modulation signal according to another implementation of the embodiment;

DETAILED DESCRIPTION

Figure 3:
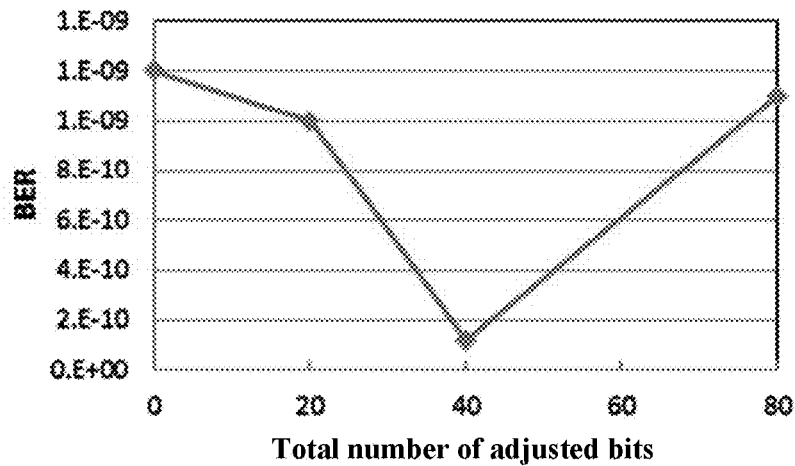
FIG. 3 is a schematic diagram of a change of a bit error rate of a multicarrier communication system along with an adjusted total number of bits.

These and further aspects and features of the present disclosure will be clear and understood with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the principles and terms of the appended claims.

An embodiment of the present disclosure provides a bit allocation method for a multicarrier modulation signal. According to a conventional bit allocation method, tolerance of clipping distortion of different subcarriers is different. As signal distortion of a clipping operation will produce interference of the same amplitude on each subcarrier, tolerance of clipping distortion of the subcarrier of maximum number of modulation bits and of minimum average power is lowest, and a probability of producing a burst error is maximal. Hence, the bit allocation method of the embodiment of the present disclosure increases tolerance of clipping distortion of a multicarrier modulation signal by lowering a number of allocated bits of a subcarrier of lowest tolerance of clipping distortion, thereby lowering burst errors, and ensuring success of FEC decoding.

The method, apparatus and system of the embodiments of the present disclosure shall be described below with reference to the accompanying drawings and particular implementations.

Embodiment 1

An embodiment of the present disclosure provides a bit allocation method for a multicarrier modulation signal. FIG. 1 is a flowchart of the method. Referring to FIG. 1, the method includes:

step 101: lowering the number of bits of a subcarrier of minimum average power in subcarriers of the multicarrier modulation signal allocated with a maximum number of bits according to a predetermined total number of bits to be adjusted.

In this embodiment, as described above, tolerance of clipping distortion of the subcarriers of maximum number of modulation bits is different, wherein, tolerance of clipping distortion of the subcarriers of relatively high average power is relatively high, and their performance are similar to those of the subcarriers of sub-maximum number of modulation bits and of relatively small power. Hence, direct adjustment of all the subcarriers of the maximum number of modulation bits will probably results in excessive operation, thereby resulting in excessive change of an original bit allocation result, and lowering performance of the system. The method of this embodiment takes not only the subcarriers of maximum number of modulation bits, but also the average power of these subcarriers, into account. As described above, since the tolerance of clipping distortion of the subcarriers of maximum number of modulation bits and of minimum average power is lowest, and the probabilities of occurrence of a burst error for such subcarriers are also highest, the tolerance of clipping distortion of such subcarriers may be increased by lowering the number of bits of such subcarriers, thereby reducing burst errors, and ensuring success of FEC (forward error correction) decoding.

In this embodiment, the total number of bits to be adjusted, i.e. the number of bits to be reduced, may be predetermined, and this embodiment is not limited thereto.

In an implementation, step 101 may be carried out by the method shown in FIG. 2. As shown in FIG. 2, the method includes:

step 201: setting a total number of bits to be adjusted;

step 202: determining a target number of bits according to the total number of bits to be adjusted;

step 203: allocating a bit number and average power for each subcarrier of the multicarrier modulation signal by using a predetermined bit allocation method according to the target number of bits; and step 204: lowering the number of bits of a subcarrier of minimum average power in the subcarriers allocated with a maximum number of bits, until a lowered total number of bits is equal to the total number of bits to be adjusted.

In step 201, the total number of bits to be adjusted is denoted by n, which is the number of bits needing to be lowered, and may be determined according to a predetermined policy, such as a simulation result, a system capacity, and channel quality, etc., and this embodiment is not limited thereto.

In step 202, the target number of bits is denoted by m, which is a sum of a total number k of bits to which a rate of the communication system corresponds and the above total number n of bits to be adjusted, that is, m=k+n, wherein, the total number k of bits to which the rate of the communication system corresponds is constant, and the target number m of bits may be determined according to the above total number of bits to be adjusted.

In step 203, after the target number of bits is determined, bit numbers and average power may be allocated for the subcarriers of the multicarrier modulation signal by using a predetermined bit allocation method. The predetermined bit allocation method is not limited in this embodiment, which may be a conventional bit allocation method, such as a Chow's bit allocation algorithm [P. S. Chow et. al., "A Practical Discrete Multitone Transceiver Loading Algorithm for Data Transmission over Spectrally Shaped Channels", Trans. Comm., vol 43, no 2, pp 773 (1995)], and may also be other bit allocation methods.

In step 204, after the bit numbers and average power are allocated for the subcarriers, the subcarrier of minimum average power in the subcarriers allocated with maximum number of bits may be found therefrom, so as to lower the bit number of the found subcarrier, and keep their average power constant.

In this embodiment, the number of bits of the above subcarrier may be lowered by taking a predetermined number of bits, such as 1, as a step, that is, lowering the number of bits of the subcarrier by 1 after finding the subcarrier of minimum average power in the subcarriers allocated with maximum number of bits, and keeping its average power unchanged. Then step 204 is repeated, that is, keeping on finding the subcarrier of minimum average power in the subcarriers allocated with maximum number of bits in all the subcarriers, lowering the number of bits of the found subcarriers by 1, and keeping their power unchanged, until a lowered total number of bits is equal to the total number of bits to be adjusted.

The above method of lowering the number of bits by taking 1 as a step is illustrative only, and in a particular implementation, the number of bits may be lowered taking other numbers of bits as a step, which is not limited in this embodiment.

FIG. 3 is a schematic diagram of a change of a bit error rate (BER) of a multicarrier communication system along with an adjusted total number of bits. In this example, an adjusted total number of bits being 0 corresponds to the conventional Chow's bit allocation algorithm. It can be seen from FIG. 3 that by reasonably setting an adjusted total number of bits, the bit allocation method of the embodiment of the present disclosure may efficiently lower a bit error rate.

The bit allocation method for a multicarrier modulation signal of the embodiment of the present disclosure increases the tolerance of clipping distortion of the multicarrier modulation signal by lowering the number of allocated bits of the subcarriers of lowest tolerance of clipping distortion, thereby lowering burst errors, and ensuring success of FEC decoding.

Embodiment 2

An embodiment of the present disclosure provides a bit allocation apparatus for a multicarrier modulation signal. As principles of the apparatus for solving problems are similar to that of the method according to Embodiment 1, the implementation of the method according to Embodiment 1 may be referred to for the implementation of the apparatus, and the repeated parts shall not be described herein any further.

Figure 4:
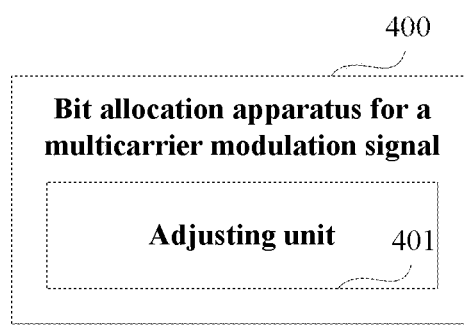
FIG. 4 is a schematic diagram of a bit allocation apparatus for a multicarrier modulation signal according to an implementation of the embodiment.

FIG. 4 is a schematic diagram of a structure of the bit allocation apparatus for a multicarrier modulation signal of this embodiment. Referring to FIG. 4, the apparatus 400 includes an adjusting unit 401 configured to lower the number of bits of a subcarrier of minimum average power in subcarriers of the multicarrier modulation signal allocated with a maximum number of bits.

Figure 5:
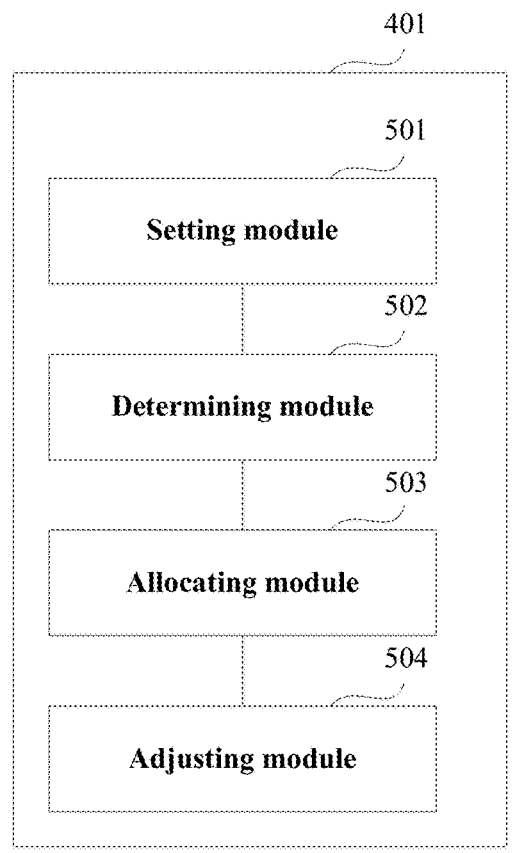
FIG. 5 is a schematic diagram of a bit allocation apparatus for a multicarrier modulation signal according to another implementation of the embodiment.

In an implementation, as shown in FIG. 5, the adjusting unit 401 includes a setting module 501, a determining module 502, an allocating module 503 and an adjusting module 504; wherein, the setting module 501 is configured to set a total number of bits to be adjusted;

the determining module 502 is configured to determine the target number of bits according to the total number of bits to be adjusted set by the setting module;

the allocating module 503 is configured to allocate a bit number and average power for each subcarrier of the multicarrier modulation signal by using a predetermined bit allocation method according to the target number of bits determined by the determining module;

and the adjusting module 504 is configured to lower the number of bits of a subcarrier of minimum average power in the subcarriers allocated with a maximum number of bits, until a lowered total number of bits is equal to the total number of bits to be adjusted.

In this implementation, the determining module 502 determines the target number of bits as a sum of a total number of bits to which a rate of the communication system corresponds and the above total number of bits to be adjusted.

In this implementation, the adjusting module 504 may lower the number of bits of a subcarrier of minimum average power in the subcarriers allocated with a maximum number of bits by taking a predetermined number of bits as a step, until a lowered total number of bits is equal to the total number of bits to be adjusted. In an implementation, the predetermined number of bits is 1.

The bit allocation apparatus for a multicarrier modulation signal of the embodiment of the present disclosure increases the tolerance of clipping distortion of the multicarrier modulation signal by lowering the number of allocated bits of the subcarriers of lowest tolerance of clipping distortion, thereby lowering burst errors, and ensuring success of FEC decoding.

Embodiment 3

An embodiment of the present disclosure provides a transmitter, such as a base station in a multicarrier communication system, which may include the bit allocation apparatus for a multicarrier modulation signal according to Embodiment 2.

Figure 6:
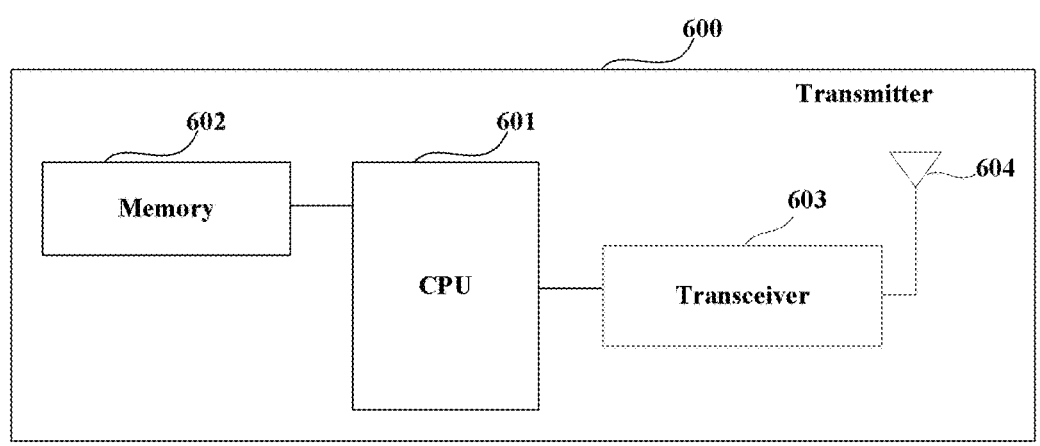
FIG. 6 is a schematic diagram of a structure of a transmitter according to the embodiment.

FIG. 6 is a schematic diagram of a structure of the transmitter of this embodiment. As shown in FIG. 6, the transmitter 600 may include a central processing unit (CPU) 601 and a memory 602, the memory 602 being coupled to the central processing unit 601. In this embodiment, the memory 602 may store various data; furthermore, it stores a program for processing information, and execute the program under control of the central processing unit 601.

In an implementation, functions of the bit allocation apparatus for a multicarrier modulation signal described in Embodiment 2 may be incorporated into the central processing unit 601, wherein, the central processing unit 601 may be configured to: lower the number of bits of a subcarrier of minimum average power in subcarriers of the multicarrier modulation signal allocated with a maximum number of bits according to a predetermined total number of bits to be adjusted.

Alternatively, the central processing unit 601 may further be configured to: set a total number of bits to be adjusted; determine the target number of bits according to the total number of bits to be adjusted; allocate a bit number and average power for each subcarrier of the multicarrier modulation signal by using a predetermined bit allocation method according to the target number of bits; lower the number of bits of a subcarrier of minimum average power in the subcarriers allocated with a maximum number of bits, until a lowered total number of bits is equal to the total number of bits to be adjusted.

In this implementation, the target number of bits is a sum of a total number of bits to which a rate of the communication system corresponds and the above total number of bits to be adjusted.

Alternatively, the central processing unit 601 may further be configured to: lower the number of bits of a subcarrier of minimum average power in the subcarriers allocated with a maximum number of bits taking a predetermined number of bits as a step, until the lowered total number of bits is equal to the total number of bits to be adjusted.

In this implementation, the predetermined number of bits may be 1.

In another implementation, the bit allocation apparatus for a multicarrier modulation signal described in Embodiment 2 and the central processing unit 601 may be configured separately. For example, the bit allocation apparatus may be configured as a chip connected to the central processing unit 601, with the functions of the bit allocation apparatus being realized under control of the central processing unit 601.

Furthermore, as shown in FIG. 6, the transmitter 600 may further include a transceiver 603, and an antenna 604, etc.; wherein, function of these components are similar to those of the prior art, and shall not be described herein any further. It should be noted that the transmitter 600 does not necessarily include all the parts shown in FIG. 6; furthermore, the transmitter 600 may include components not shown in FIG. 6, and the prior art may be referred to.

The transmitter of the embodiment of the present disclosure employs the bit allocation apparatus for a multicarrier modulation signal of an embodiment of the present disclosure, and increases the tolerance of clipping distortion of the multicarrier modulation signal by lowering the number of allocated bits of a subcarrier of lowest tolerance of clipping distortion, thereby lowering burst errors, and ensuring success of FEC decoding.

Embodiment 4

An embodiment of the present disclosure provides a receiver, such as UE in a multicarrier communication system, which may include the bit allocation apparatus for a multicarrier modulation signal according to Embodiment 2.

Figure 7:
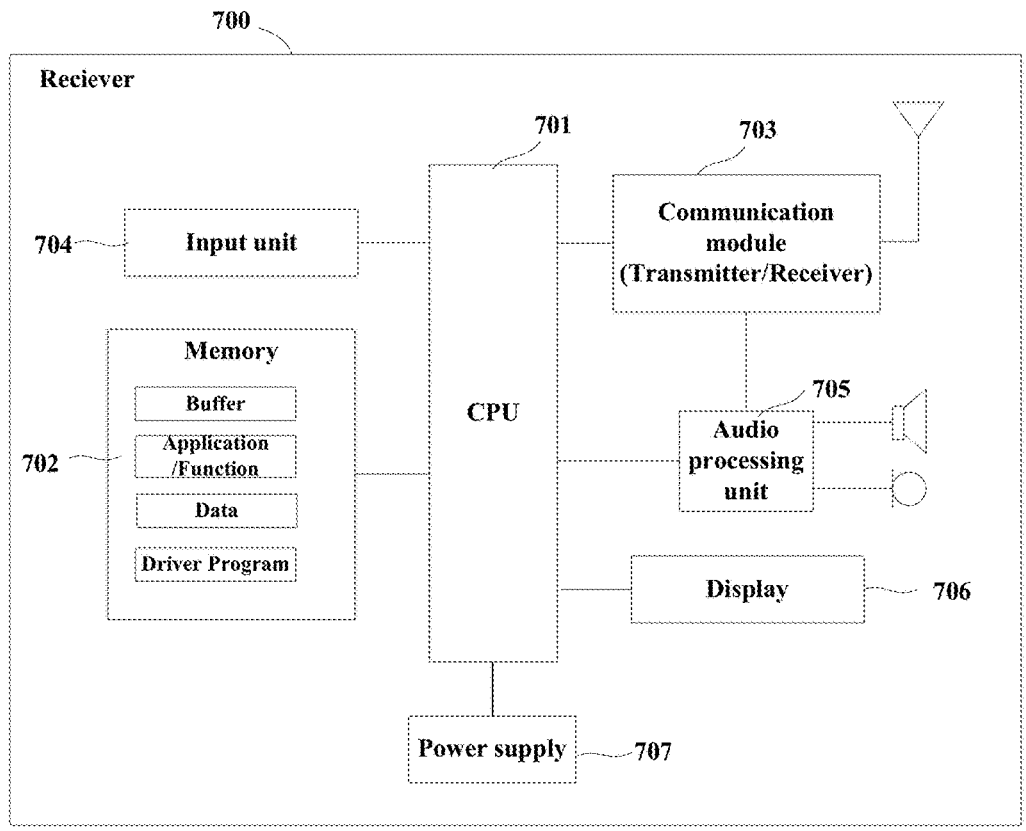
FIG. 7 is a schematic diagram of a structure of a receiver according to the embodiment.

FIG. 7 is a schematic diagram of a structure of the receiver of this embodiment. As shown in FIG. 7, the receiver 700 may include a central processing unit (CPU) 701 and a memory 702, the memory 702 being coupled to the central processing unit 701. it should be noted that this figure is exemplary only, and other types of structures may be used to supplement or replace this structure for the realization of telecommunications functions or other functions.

In an implementation, functions of the bit allocation apparatus for a multicarrier modulation signal described in Embodiment 2 may be incorporated into the central processing unit 701, wherein the central processing unit 701 may be configured to: lower the number of bits of a subcarrier of minimum average power in subcarriers of the multicarrier modulation signal allocated with a maximum number of bits according to a predetermined total number of bits to be adjusted.

Alternatively, the central processing unit 701 may further be configured to: set a total number of bits to be adjusted; determine the target number of bits according to the total number of bits to be adjusted; allocate a bit number and average power for each subcarrier of the multicarrier modulation signal by using a predetermined bit allocation method according to the target number of bits; lower the number of bits of a subcarrier of minimum average power in the subcarriers allocated with a maximum number of bits, until a lowered total number of bits is equal to the total number of bits to be adjusted.

In this implementation, the target number of bits is a sum of a total number of bits to which a rate of the communication system corresponds and the above total number of bits to be adjusted.

Alternatively, the central processing unit 701 may further be configured to: lower the number of bits of a subcarrier of minimum average power in the subcarriers allocated with a maximum number of bits taking a predetermined number of bits as a step, until the lowered total number of bits is equal to the total number of bits to be adjusted.

In this implementation, the predetermined number of bits may be 1.

In another implementation, the bit allocation apparatus and the central processing unit 701 may be configured separately. For example, the bit allocation apparatus may be configured as a chip connected to the central processing unit 701, with functions of the bit allocation apparatus being realized under control of the central processing unit 701.

Furthermore, as shown in FIG. 7, the receiver 700 may include a communication module 703, an input unit 704, an audio processing unit 705, a display 76, and a power supply 707. It should be noted that the receiver 700 does not necessarily include all the parts shown in FIG. 7; furthermore, the receiver 700 may include components not shown in FIG. 7, and the prior art may be referred to.

As shown in FIG. 7, the central processing unit 701 is sometimes referred to as a controller or control, and may include a microprocessor or other processor devices and/or logic devices. The central processing unit 701 receives input and controls operations of every components of the receiver 700.

In this embodiment, the memory 702 may be, for example, one or more of a buffer memory, a flash memory, a hard drive, a mobile medium, a volatile memory, a nonvolatile memory, or other suitable devices, which may store predefined or preconfigured information, and may further store a program executing related information. And the central processing unit 701 may execute the program stored in the memory 702, so as to realize information storage or processing, etc. Functions of other parts are similar to those of the prior art, which shall not be described herein any further. The parts of the receiver 700 may be realized by specialized hardware, firmware, software, or any combination thereof, without departing from the scope of the present disclosure.

The receiver of the embodiment of the present disclosure employs the bit allocation apparatus for a multicarrier modulation signal of an embodiment of the present disclosure, and increases the tolerance of clipping distortion of the multicarrier modulation signal by lowering the number of allocated bits of a subcarrier of lowest tolerance of clipping distortion, thereby lowering burst errors, and ensuring success of FEC decoding.

Embodiment 5

Figure 8:
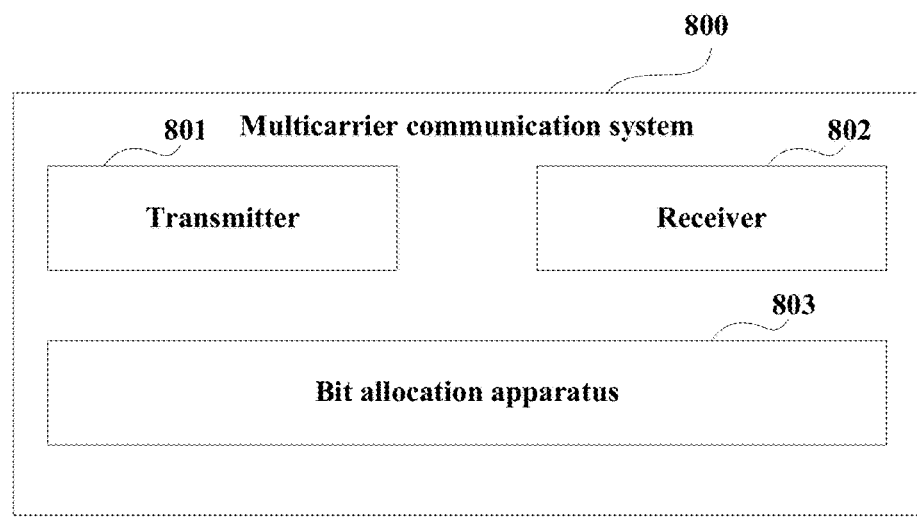
FIG. 8 is a schematic diagram of a structure of the multicarrier communication system according to the embodiment.

An embodiment of the present disclosure further provides a multicarrier communication system. FIG. 8 is a schematic diagram of a structure of the multicarrier communication system of this embodiment. As shown in FIG. 8, the communication system 800 includes a transmitter 801, a receiver 802 and a bit allocation apparatus 803; for example, the bit allocation apparatus 803 may be carried out by the bit allocation apparatus according to Embodiment 2, the contents of which being incorporated herein, and being not going to be described herein any further.

The multicarrier communication system of the embodiment of the present disclosure employs the bit allocation apparatus for a multicarrier modulation signal of an embodiment of the present disclosure, and increases the tolerance of clipping distortion of the multicarrier modulation signal by lowering the number of allocated bits of a subcarrier of lowest tolerance of clipping distortion, thereby lowering burst errors, and ensuring success of FEC decoding.

An embodiment of the present disclosure further provides a computer-readable program, wherein when the program is executed in a bit allocation apparatus, the program enables a computer to carry out the method according to Embodiment 1 in the bit allocation apparatus.

According to a further aspect of the embodiments of the present disclosure, there is provided a storage medium in which a computer-readable program is stored, wherein the computer-readable program enables a computer to carry out the method according to Embodiment 1 in a bit allocation apparatus.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For the implementation of the present disclosure containing the above embodiments, following supplements are further disclosed.

Supplement 1. A bit allocation apparatus, including:
an adjusting unit configured to lower the number of bits of a subcarrier of minimum average power in subcarriers of the multicarrier modulation signal allocated with a maximum number of bits according to a predetermined total number of bits to be adjusted.

Supplement 2. The apparatus according to supplement 1, wherein the adjusting unit includes:
a setting module configured to set a total number of bits to be adjusted;
a determining module configured to determine the target number of bits according to the total number of bits to be adjusted set by the setting module;
an allocating module configured to allocate a bit number and average power for each subcarrier of the multicarrier modulation signal by using a predetermined bit allocation method according to the target number of bits determined by the determining module; and
an adjusting module configured to lower the number of bits of a subcarrier of minimum average power in the subcarriers allocated with a maximum number of bits, until a lowered total number of bits is equal to the total number of bits to be adjusted.

Supplement 3. The apparatus according to supplement 2, wherein the determining module determines the target number of bits as a sum of a total number of bits to which a rate of the communication system corresponds and the above total number of bits to be adjusted.

Supplement 4. The apparatus according to supplement 2, wherein the adjusting module lowers the number of bits of a subcarrier of minimum average power in the subcarriers allocated with a maximum number of bits taking a predetermined number of bits as a step, until the lowered total number of bits is equal to the total number of bits to be adjusted.

Supplement 5. The apparatus according to supplement 4, wherein the predetermined number of bits is 1.

Supplement 6. A transmitter in a multicarrier communication system, including a bit allocation apparatus, wherein the bit allocation apparatus is configured to:
lower the number of bits of a subcarrier of minimum average power in subcarriers of a multicarrier modulation signal allocated with a maximum number of bits according to a predetermined total number of bits to be adjusted.

Supplement 7. The transmitter according to supplement 6, wherein the bit allocation apparatus is further configured to:
set a total number of bits to be adjusted;
determine a target number of bits according to the total number of bits to be adjusted;
allocate a bit number and average power for each subcarrier of the multicarrier modulation signal by using a predetermined bit allocation method according to the target number of bits; and
lower the number of bits of a subcarrier of minimum average power in the subcarriers allocated with a maximum number of bits, until a lowered total number of bits is equal to the total number of bits to be adjusted.

Supplement 8. The transmitter according to supplement 7, wherein the target number of bits is a sum of a total number of bits to which a rate of the communication system corresponds and the above total number of bits to be adjusted.

Supplement 9. The transmitter according to supplement 7, wherein the bit allocation apparatus is further configured to:
lower the number of bits of a subcarrier of minimum average power in the subcarriers allocated with a maximum number of bits taking a predetermined number of bits as a step, until the lowered total number of bits is equal to the total number of bits to be adjusted.

Supplement 10. The transmitter according to supplement 9, wherein the predetermined number of bits is 1.

Supplement 11. A receiver in a multicarrier communication system, including a bit allocation apparatus, wherein the bit allocation apparatus is configured to:
lower the number of bits of a subcarrier of minimum average power in subcarriers of a multicarrier modulation signal allocated with a maximum number of bits according to a predetermined total number of bits to be adjusted.

Supplement 12. The receiver according to supplement 11, wherein the bit allocation apparatus is further configured to:
set a total number of bits to be adjusted;
determine a target number of bits according to the total number of bits to be adjusted;
allocate a bit number and average power for each subcarrier of the multicarrier modulation signal by using a predetermined bit allocation method according to the target number of bits; and lower the number of bits of a subcarrier of minimum average power in the subcarriers allocated with a maximum number of bits, until a lowered total number of bits is equal to the total number of bits to be adjusted.

Supplement 13. The receiver according to supplement 12, wherein the target number of bits is a sum of a total number of bits to which a rate of the communication system corresponds and the total number of bits to be adjusted.

Supplement 14. The receiver according to supplement 12, wherein the bit allocation apparatus is further configured to:
lower the number of bits of a subcarrier of minimum average power in the subcarriers allocated with a maximum number of bits taking a predetermined number of bits as a step, until the lowered total number of bits is equal to the total number of bits to be adjusted.

Supplement 15. The receiver according to supplement 14, wherein the predetermined number of bits is 1.

The invention claimed is:

1. A bit allocation apparatus for a multicarrier modulation signal in a multicarrier communication system, comprising:
a memory configured to store a program; and
a processor coupled to the memory and configured to,
set a predetermined total number of bits to be adjusted;
determine a target number of bits as a sum of a rate based on a total number of bits to which a rate of the multicarrier communication system corresponds and the predetermined total number of bits to be adjusted;
allocate a bit number and average power for each subcarrier of the multicarrier modulation signal by using a predetermined bit allocation method according to the target number of bits; and
lower a number of bits of a subcarrier of minimum average power in the subcarriers of the multicarrier modulation signal that is allocated with a maximum number of bits, until a lowered total number of bits is equal to the predetermined total number of bits to be adjusted.

2. The bit allocation apparatus according to claim 1, wherein the processor is further configured to execute the program to lower the number of bits of the subcarrier of minimum average power in the subcarriers of the multicarrier modulation signal allocated with the maximum number of bits using a predetermined number of bits in a step, until the lowered total number of bits is equal to the predetermined total number of bits to be adjusted.

3. The bit allocation apparatus according to claim 2, wherein the predetermined number of bits is 1.

4. A transmitter in a multicarrier communication system, including a bit allocation apparatus, wherein the bit allocation apparatus comprises:
a memory configured to store a program; and
a processor coupled to the memory and configured to,
set a predetermined total number of bits to be adjusted;
determine a target number of bits as a sum of a rate based on a total number of bits to which a rate of the multicarrier communication system corresponds and the predetermined total number of bits to be adjusted;
allocate a bit number and average power for each subcarrier of the multicarrier modulation signal by using a predetermined bit allocation method according to the target number of bits; and
lower a number of bits of a subcarrier of minimum average power in the subcarriers of the multicarrier modulation signal that is allocated with a maximum number of bits, until a lowered total number of bits is equal to the predetermined total number of bits to be adjusted.

5. The transmitter according to claim 4, wherein the bit allocation processor apparatus is further configured to execute the program to:
lower the number of bits of the subcarrier of minimum average power in the subcarriers of the multicarrier modulation signal allocated with the maximum number of bits using a predetermined number of bits in a step, until the lowered total number of bits is equal to the predetermined total number of bits to be adjusted.

6. The transmitter according to claim 5, wherein the predetermined number of bits is 1.

7. A receiver in a multicarrier communication system, including a bit allocation apparatus, wherein the bit allocation apparatus comprises:
a memory configured to store a program; and
a processor coupled to the memory and configured to,
set a predetermined total number of bits to be adjusted;
determine a target number of bits as a sum of a rate based on a total number of bits to which a rate of the multicarrier communication system corresponds and the predetermined total number of bits to be adjusted;
allocate a bit number and average power for each subcarrier of the multicarrier modulation signal by using a predetermined bit allocation method according to the target number of bits; and
lower a number of bits of a subcarrier of minimum average power in the subcarriers of a multicarrier modulation signal that is allocated with a maximum number of bits, until a lowered total number of bits is equal to the predetermined total number of bits to be adjusted.

8. The receiver according to claim 7, wherein the processor is further configured to execute the program to:
lower the number of bits of the subcarrier of minimum average power in the subcarriers of a multicarrier modulation signal allocated with the maximum number of bits using a predetermined number of bits in a step, until the lowered total number of bits is equal to the predetermined total number of bits to be adjusted.

9. The receiver according to claim 8, wherein the predetermined number of bits is 1.

* * * * *

UNITED STATES PATENT AND TRADEMARK OFFICE
CERTIFICATE OF CORRECTION

PATENT NO. : 10,454,638 B2
APPLICATION NO. : 14/927636
DATED : October 22, 2019
INVENTOR(S) : Weizhen Yan et al.

It is certified that error appears in the above-identified patent and that said Letters Patent is hereby corrected as shown below:

On the Title Page

On Page 2, item (56) References Cited; Other Publications; please add the following citation:
-- Xiufeng Tan, *Theoretical research and algorithm implementation for subcarrier and power allocation in OFDM system*, China's Excellent Master's Thesis Full Text Database Informational Technology Editor (issued November 15, 2009), in its entirety (65 pages) (claims involved 1-10) --

Signed and Sealed this
Seventeenth Day of November, 2020

Andrei Iancu
*Director of the United States Patent and Trademark Office*